United States Patent [19]

Furuuchi

[11] Patent Number: 4,879,159

[45] Date of Patent: Nov. 7, 1989

[54] DECORATIVE FOAMED GLASS WITH DENSE GLASS SURFACE LAYER AND METHOD OF PRODUCING SAME

[75] Inventor: Toshiharu Furuuchi, Takaishi, Japan

[73] Assignee: Central Glass Company, Limited, Ube, Japan

[21] Appl. No.: 239,197

[22] Filed: Aug. 26, 1988

[30] Foreign Application Priority Data

Aug. 31, 1987 [JP] Japan .................. 62-215199

[51] Int. Cl.$^4$ .......... B32B 3/00; B32B 3/26; B29C 27/60

[52] U.S. Cl. .................. 428/161; 264/42; 264/43; 428/213; 428/309.9; 428/312.4; 428/312.6; 428/699

[58] Field of Search ............ 428/213, 215, 161, 162, 438/304.4, 309.9, 312.2, 312.6, 312.8, 699, 701; 264/41, 42, 43

[56] References Cited

U.S. PATENT DOCUMENTS 4,798,758 1/1989 Nagano et al. .................. 428/312.6

FOREIGN PATENT DOCUMENTS 60-166239 8/1985 Japan .

Primary Examiner—William J. Van Balen
Attorney, Agent, or Firm—Fleit, Jacobson, Cohn, Price, Holman & Stern

[57] ABSTRACT

The invention relates to a foamed glass plate which has a dense glass surface layer on a foamed glass layer and which is useful as a building interior material or a furniture material. The interface between the two layers is made wavy, and the dense glass surface layer is made transparent or translucent so that a wavy pattern can be seen through the dense glass layer. For example, the interface is corrugated or rippled. The foamed glass plate can be produced by the steps of layering a granular material of foam glass on a conveyor belt made of a heat resistant material, desirably waving the upper surface of the layered material, overlaying the waved surface with a layer of a granular or powdery material of dense glass and firing the materials in layers on the belt in a furnace. The surface of the initially layered material can be corrugated by, for example, vertically oscillating the belt while the foam glass material is poured on the belt or can be rippled by pouring glass grains of suitably regulated grain size, as the material of the dense glass layer, onto a flat layer of the foam glass material.

14 Claims, 1 Drawing Sheet

U.S. Patent    Nov. 7, 1989    4,879,159

DECORATIVE FOAMED GLASS WITH DENSE GLASS SURFACE LAYER AND METHOD OF PRODUCING SAME

BACKGROUND OF THE INVENTION

This invention relates to a foamed glass plate, which is made up of a base layer of foamed glass and a surface layer of dense and transparent or translucent glass and has a decorative pattern at the interface between the two layers, and method of producing same. The foamed glass plate is suitable for use as a decorative surface material in buildings or as a furniture material.

Foamed glass is low in specific gravity and high in heat-insulating ability and gives an attractive appearance, and hence growing interest has been shown in use of foamed glass as a building interior material. However, foamed glass is relatively low in mechanical strength and also in resistance to flawing of surfaces. It is known, as shown in JP-A 60-166239 for instance, to cover at least one major surface of a foamed glass plate with a glass layer which is foamless or low in porosity and tightly bonds to the foamed glass surface. The low-porosity or dense glass layer provides an outer surface fairly resistant to flawing and enhances mechanical strength of the two-layer glass plate as a whole. Besides, the dense glass layer affords the foamed glass plate with glossiness and graveness characteristic of glass and produces an ornamental effect.

SUMMARY OF THE INVENTION

It is an object of the present invention to provide a foamed glass plate, which has a dense glass surface layer tightly and strongly bonded to the base layer of foamed glass and gives an elegant and attractive appearance.

It is another object of the invention to provide an industrially advantageous method for producing a foamed glass plate according to the invention.

According to the invention there is provided a foamed glass plate comprising a foamed glass layer, which is a base layer of the glass plate and has a wavy surface, and a dense glass surface layer which is transparent or translucent and tightly bonds to the wavy surface of the foamed glass layer.

In other words, a foamed glass plate according to the invention has a wavy interface between the foamed glass layer and the dense glass surface layer. The wavy interface can be seen through the dense and transparent or translucent glass layer. Hence the foamed glass plate has a wavy pattern. Preferred examples of the wavy pattern are corrugated patterns and rippled patterns. In combination with the foams in the base layer the wavy pattern seen through the dense glass surface layer gives an elegant and very attractive appearance, and the dense glass surface layer adds graveness to such an appearance. Besides, the waviness of the interface between the foamed glass layer and the dense glass layer has an anchoring effect by which the strength of bond between the two layers is greatly enhanced.

Foamed glass plates according to the invention are advantageously useful as building interior materials and furniture materials.

For industrially producing a foamed glass plate according to the invention it is favorable to use a horizontally running conveyor belt which is made of a heat resistant material and passes through a furnace for firing glass materials.

To produce a foamed glass plate with a corrugated interface between the foamed glass layer and the dense glass layer, a preferred method comprises the steps of pouring a granular or powdery first material comprising a glass powder and a foaming agent on the aforementioned conveyor belt so as to layer the first material on the belt and corrugating the upper surface of the layered material, then pouring a second material comprising a powdery or granular glass on the layered the first material so as to form a layer of the second material on the layer of the first material, introducing the first and second materials in layers on the belt into the furnace, and in the furnace firing the first and second materials in layers on the belt to cause fusion of the glasses in the respective layers and foaming of the fused first material.

For example, the upper surface of the first material layer can be corrugated by vertically oscillating the conveyor belt with a suitable mechanism.

To produce a foamed glass plate with a rippled interface between the foamed glass layer and the dense glass layer, a preferred method comprises the steps of pouring the aforementioned granulated first material on the conveyor belt so as to layer the first material on the belt, pouring a second material comprising glass grains which are 0.5–5 mm in grain size on the first material layer on the belt so as to ripple the upper surface of the first material layer with the glass grains and overlay the rippled surface with the second material, introducing the first and second materials in layers on the belt into the furnace, and in the furnace firing the first and second materials in layers on the belt to cause fusion of the glasses in the respective layers and foaming of the fused first material.

In a minor modification of this method, the quantity of the second material is decreased so as to provide only an interfacial part of the dense glass layer, and a complementary glass material which is not necessarily granular is layered on the second material layer before introducing the materials on the belt into the furnace.

DESCRIPTION OF THE PREFERRED EMBODIMENTS

Figure 1:
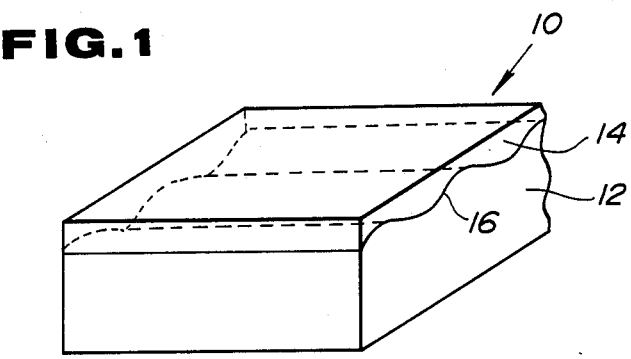
FIG. 1 is a perspective view of a foamed glass plate as an embodiment of the present invention.

As an embodiment of the invention FIG. 1 shows a foamed glass plate 10 which is made up of a base layer 12 of a foamed glass and a surface layer 14 of a dense and transparent or translucent glass. The interface 16 between the two layers 12 and 14 is a corrugated plane. When the dense glass surface layer 14 is transparent the corrugated interface 16 can be seen through the surface layer 14 fairly clearly and three-dimensionally, whereby the foamed glass plate 10 presents a beautiful appearance. When the surface layer 14 is translucent the ridges of the corrugation can dimly be seen through the surface layer 14, so that the foamed glass plate 10 seems to have a stripe pattern.

Figure 2:
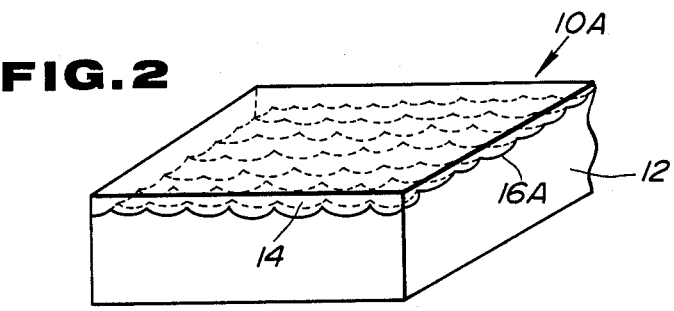
FIG. 2 is a perspective view of another foamed glass plate embodying the invention.

As another embodiment of the invention FIG. 2 shows a foamed glass plate 10A, which too is made up of a basic foamed glass layer 12 and a dense and transparent or translucent glass surface layer 14. In this embodiment the interface 16A between the two layers 12 and 14 is rippled. When the surface layer 14 is transparent the rippled pattern at the interface 16A can be seen through the surface layer 14 fairly clearly and three-dimensionally, whereby the foamed glass plate 10A presents a tasteful appearance. When the surface layer 14 is translucent peak parts of the ripples can dimly be seen through the surface layer 14, so that the foamed glass plate 10A seems to have a mottled pattern and assumes a differently tasteful appearance.

In any case the porosity or apparent specific gravity of the foamed glass layer 12 is not strictly limited, but usually it is suitable to form this layer 12 so as to have an apparent specific gravity in the range from 0.2 to 1.2. Usually and preferably the glass of the foamed glass layer 12 is a color glass.

The dense glass surface layer 14 is an unfoamed and relatively thin layer. Aside from an ornamental effect, the purpose of the dense glass surface layer 14 is preventing breaking of the foamed glass layer 12 and providing a flaw resistant and abrasion resistant surface. For such purpose it suffices that the dense glass layer 14 has a thickness of 1 to 5 mm. If the dense glass layer 14 is made unnecessarily thick, lightweightness and heat insulating ability of the foamed glass plate are impaired. It is preferable that the thickness of the dense glass layer 14 is not more than ¼ of the whole thickness of the foamed glass plate 10 or 10A. The dense glass layer 14 may be a color glass layer insofar as it is transparent or translucent.

The raw material of the foamed glass layer 12 is essentially a mixture of a powder of an ordinary glass such as, for example, soda lime glass, borosilicate glass or aluminosilicate glass and a conventional foaming agent in fine powder form, such as lime stone or calcium carbonate, dolomite or carbon. It is suitable to use a glass powder not larger than 150 $\mu$m, preferably not larger than 70 $\mu$m, in particle size. Optionally, inorganic pigment and/or heat-resistant filler may be added. It is possible to use a powder mixture of glass forming oxides in place of the glass powder. Usually the powdery mixture of the raw materials is granulated into about 0.1–3 mm granules by using a suitable binder such as water glass.

The material of the dense glass layer 14 is a powdery or granular glass which may be a color glass. Alternatively a powdery mixture of glass forming oxides can be used. It is preferable to use a powdery or granular glass not smaller than 0.2 mm in particle or grain size, because when smaller particles of glass are fired for melting in a layered state the resultant dense glass layer is likely to have cracks attributed to a considerable reduction in the bulk of the melted glass layer and, besides, is likely to contain fine air bubbles which impare transparency. On the other hand, the grain size of the granular glass should be limited to about 5 mm because use of larger glass grains results in an undesirably great thickness of the dense glass layer 14.

A foamed glass plate according to the invention is produced by the steps of layering the material of the foamed glass layer 12, forming a desired wavy pattern in the upper surface of the layered material, overlaying the wavy surface with the material of the dense glass layer 14, and firing the two materials in layers to accomplish melting of the respective layers and foaming of the lower layer. Optionally a pressure of suitable magnitued may be applied to the layered materials from the upside either during firing operation or immediately after completion of firing. This is effective for complete melting of the glass particles or grains, for degassing of the upper layer and for enhancement of tight bonding of the dense glass layer to the foamed glass layer. The firing operation is followed by a usual cooling or annealing treatment. By taking these steps a tight and strong fusion bond is created between the foamed glass layer 12 and the dense glass layer 14.

It is also possible to take the steps of first layering the material of the dense glass layer 14 and forming a wavy pattern on the surface of the layered material, overlaying the layer having the wavy surface with the material of the foamed glass layer 12, and firing the two materials in layers. However, this option is not advantageous because in this case very strict selection and control of the firing conditions are necessary for producing a desired wavy pattern, in particular a rippled pattern. If the firing temperature is too high and/or the firing time is too long the interface between the two layers becomes nearly flat, and if the firing temperature is too low and/or the firing time is too short air bubbles are confined in the dense glass layer.

The methods of layering the respective materials and forming a wavy pattern in the surface of the firstly layered material are not limited. For example, first the material of the foamed glass layer is put into a molding box so as to provide a bed having a predetermined thickness, and the upper surface of the bed is corrugated or rippled by any means, even by handwork, and then the material of the dense glass layer is poured into the molding box to form a relatively thin layer on the bed having the corrugated or rippled surface. However, in industrial practice it is advantageous to layer the above described materials on a conveyor belt which runs through a furnace for firing the layered materials. The following examples illustrate the manufacture of foamed glass plates according to the invention by using a conveyor belt.

EXAMPLE 1

Figure 3:
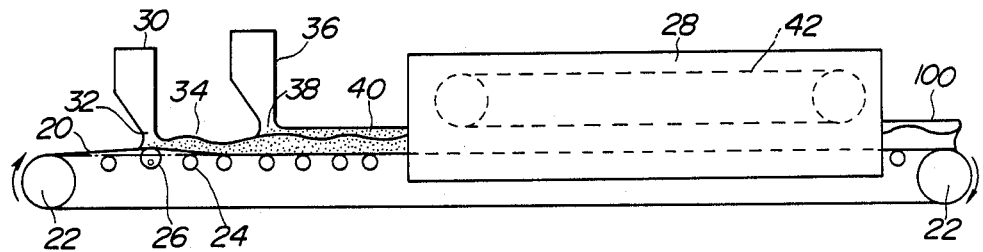
FIG. 3 is a schematic illustration of an apparatus used in producing a foamed glass plate of the type shown in FIG. 1.

A foamed glass plate of the type shown in FIG. 1 was produced by using an endless conveyor belt 20 shown in FIG. 3, which was made of steel and driven by pulleys 22 to run through a furnace 28. Among belt supporting rolls 24 there was an eccentric roll 26, and a first hopper 30 was positioned such that its discharge opening 32 was above the eccentric roll 26 at a short distance from the upper surface of the belt 20. The opening 32 was nearly equal in width to the belt 20. A second hopper 36 was located between the first hopper 30 and the furnace 28. The discharge opening 38 of this hopper 36 was nearly equal in width to the belt 20 and was adequately spaced from the upper surface of the belt 20.

As the material of the foamed glass layer 12, a mixture of a soda lime glass powder smaller than 70 $\mu$m in particle size, calcium carbonate powder as a foaming agent and a CoO base pigment was granulated into grains having a mean grain size of 0.5 mm by using water glass as binder. From the first hopper 30 the granulated material, indicated at 34, was poured onto the running conveyor belt 20 while the belt 20 was forced to locally and vertically oscillate by the turning of the eccentric roll 26. That is, the distance between the belt 20 and the discharge opening 32 of the hopper 30 periodically increased and decreased. Therefore, a corrugated layer of the granulated material 34 was formed on the belt 20 with corrugations transversal of the belt 20.

The material of the dense glass layer 14 was a granular glass having a mean grain size of 0.4 mm. From the second hopper 36 the granular glass indicated at 40 was poured onto the corrugated layer of the precedingly poured material 34. The thickness of the granular glass layer 40 varied spontaneously and periodically as the distance of the discharge opening 38 of the hopper 36 from the corrugated surface of the firstly formed layer 34 periodically increased and decreased.

In the furnace 28 the two kinds of materials 34 and 40 in layers on the belt 20 were fired at about 800° C. for about 30 min to cause melting and foaming of the firstly layered material 34 and, simultaneously, melting of the overlying material 40. As a natural consequence a fusion bond was created between the melted two layers. In the furnace 28 there was an endless steel belt 42 having a smooth outer surface. During the firing operation this endless belt 42 was run so as to press the upper surface of the glass layer 40. The conveyor belt 20 carried a foamed and unsolidified glass plate 100 out of the furnace 28 and into an annealing furnace (not shown). After annealing the foamed glass plate (10) was cut into desired sizes.

The foamed glass plate 10 produced by the above process had a corrugated interface 16 between the foamed glass layer 12 and the dense glass surface layer 14. Although the surface layer 14 was formed of a transparent glass and had a flat upper surface, this layer 14 seemed to be translucent because of existence of countless and microscopic projections and recesses in the upper surface. Therefore, through the dense glass layer 14 only peak parts of the ridges of the corrugation at the interface 16 were dimly seen so that the foamed glass plate seemed to have a stripe pattern. When the upper surface of the dense glass layer 14 was polished to a mirror face, the corrugations at the interface 16 were clearly and three-dimensionally seen through the dense glass layer 14.

There are several alternatives to the eccentric roll 26 in the apparatus used in Example 1. For example, either a roll which turns about an arcuate axis or a cam mechanism can be used to vertically oscillate the belt 20 in the section beneath the first hopper 30 to thereby create corrugations transversal of the belt 20 in the layer of the glass material 34. It is also possible to create corrugations extending in the direction of running of the belt 20, without oscillating the belt 20, by corrugately waving the discharge opening (32) of the hopper 30 in sections transversal of the belt 20 or by first forming a first layer of the glass material 34 using the hopper 30 having a straight discharge opening 32 and then forming ridges of the same material 34 by using a plurality of small hoppers placed in a row at intervals in the direction transversal of the belt 20. If desired a means to create corrugations extending transversal of the belt 30 and a means to create corrugations extending lengthwise of the belt may be employed jointly.

EXAMPLE 2

Figure 4:
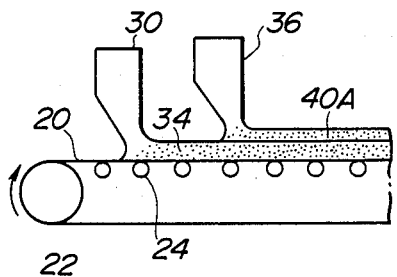
FIG. 4 shows a partial modification of the apparatus of FIG. 3 to produce a foamed glass plate of the type shown in FIG. 2.

A foamed glass plate of the type shown in FIG. 2 was produced by using an endless conveyor belt, two hoppers and a furnace arranged generally similarly to the counterparts in FIG. 3. Referring to FIG. 4, in this case there was no means to oscillate the conveyor belt 20.

The material of the foamed glass layer 12 was as described in Example 1. As the material of the dense glass layer 14, grains of soda lime glass were used. The glass grains had a mean grain size (diameter) of about 1.4 mm, and the individual grains were from 1.0 to 1.8 mm in diameter.

Figure 5:
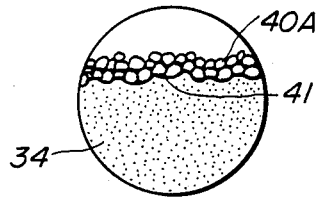
FIG. 5 is an enlarged vertical sectional view of glass materials layered on a conveyor belt in the apparatus of FIG. 4.

From the first hopper 30 the granulated material of the foamed glass layer 12 was poured onto the running belt 20 to form a flat layer 34. Onto this layer 34, the material of the dense glass layer 14 was poured from the second hopper 36 to form a layer 40A of glass grains. As illustrated in FIG. 5, the fall of the glass grains 40A on the layer 34 of the material of the foamed glass caused the upper surface of the layer 34 to minutely undulate over the entire area, and the bottom surface of the glass grain layer 40A became correspondingly undulated. Hence the interface 41 between the two layers 34 and 40 was minutely undulated or rippled. In the furnace 28 as shown in FIG. 3 the two kinds of materials 34 and 40A in layers on the belt 20 was fired at about 850° C. for about 30 min while the upper layer 40A was pressed by the steel belt 42 shown in FIG. 3 and described in Example 1. The firing operation was followed by annealing in a separate furnace.

The foamed glass plate (10A) produced in this example had a rippled interface 16A between the foamed glass layer 12 and the dense glass surface layer 14. The surface layer 14 was formed of a transparent glass and had a flat upper surface, but this layer 14 seemed to be translucent because of existence of countless and microscopic projections and recess in the upper surface. Therefore, through the dense glass layer 14 only peak parts of the ripples at the interface 16A were dimly seen so that the foamed glass plate 10A seemed to have a mottled pattern which gave an elegant appearance. When the upper surface of the dense glass layer 14 was polished to mirror face, the ripples at the interface 16A were clearly and three-dimensionally seen through the dense glass layer 14.

As illustrated by Example 2, it is convenient and preferable to create a minutely undulated interface between a layer of the material of foamed glass and an overlying layer of dense glass by using glass grains of controlled diameters as the material of dense glass. It is suitable that the diameters of the individual glass grains range from 0.5 to 5 mm. If the glass grains are smaller than 0.5 mm it is difficult to create a rippled pattern easily perceptible at sight. On the other hand, glass grains larger than 5 mm create a coarsely wavy pattern which is unsuitable for decorative purposes, and the use of such large grains results in that the dense glass surface layer has an undesirably great thickness. Preferably the diameters of the glass grains are controlled within the range from 1 to 4 mm to create a beautifully rippled pattern and to form a dense glass surface layer of an adequate thickness. At the firing operation the glass grains fuse to each other, while the melted glass of the lower layer 34 intrudes into the interstices between the glass grains by expansion resulting from foaming. Therefore further fusion of the glass grains to each other is interrupted, and an occluding interface is produced between the foamed glass layer and the overlying glass layer. The glass grains above the interfacial region completely fuse to each other to form a homogeneous and dense glass layer. The fusion of glass grains and degassing are assisted by application of pressure as mentioned hereinbefore.

In practice it is impossible to use glass grains ideally uniform in diameter. When distribution of diameters of the glass grains used to form the layer 40A in FIG. 5 is very wide, such as from 0.5 to 5 mm in the extreme case, relatively small grains fill up the interstices between relatively large grains so that the created wavy interface 41 comprises both fine ripples and relatively coarse ripples. To create a rippled pattern of less irregularity and more beautiful appearance, it is preferable to control the diameters of the individual glass grains such that deviations from a mean diameter are not more than ±0.4 mm.

It is not necessary to use glass grains of controlled diameter for the entirety of the dense glass layer 14. That is, it suffices to use glass grains of controlled diameter only in an interfacial region adjacent to the underlying material for forming the foamed glass layer. For the remaining upper part of the dense glass layer it is possible to use a granular or powdery glass rather irregular in grain or particle size. However, in such a case a glass grain layer corresponding to the layer 40A in FIG. 4 is formed by two steps using two hoppers. Therefore it is favorable to use glass grains of controlled diameter for the entirety of the dense glass surface layer.

In a foamed glass plate according to the invention, at the interface between the foamed glass layer 12 and the dense glass layer 14 it is possible to combine a corrugated pattern with a rippled pattern by, for example, jointly using the technique employed in Examples 1 and 2.

What is claimed is:

1. A foamed glass plate comprising a foamed glass layer which has a wavy surface, and a dense glass surface layer which is transparent or translucent and tightly bonds to said wavy surface of said foamed glass layer.

2. A foamed glass plate according to claim 1, wherein said wavy surface is a corrugated surface.

3. A foamed glass plate according to claim 1, wherein said wavy surface is a rippled surface.

4. A foamed glass plate according to claim 1, wherein said foamed glass layer comprises a color glass.

5. A foamed glass plate according to claim 1, wherein the thickness of said dense glass surface layer is not more than ¼ of the whole thickness of the foamed glass plate.

6. A method for producing a foamed glass plate having a foamed glass layer which has a wavy surface and a dense and transparent or translucent glass surface layer which tightly bonds to the wavy surface of the foamed glass layer, the method comprising the steps of:
 (a) pouring a granular or powdery first material comprising a glass powder and a foaming agent onto a conveyor belt, which is made of a heat resistant material and runs horizontally, so as to layer the first material on the belt;
 (b) corrugating the upper surface of the layer of said first material on said belt;
 (c) pouring a second material comprising a granular or powdery glass onto said layer of the first material so as to layer the second material on said layer of the first material; and
 (d) introducing said first and second materials in layers on said belt into a furnace and in said furnace firing said first and second materials in layers on said belt to cause fusion of the glasses in the respective layers and foaming of the fused first material.

7. A method according to claim 6, wherein the step (b) comprises the step of vertically oscillating said belt in a region where said first material is poured so as to periodically vary the vertical distance between said belt and a level plane from which said first material is falling.

8. A method according to claim 6, further comprising the step of pressing the upper surface of said layer of said second material during or immediately after the step (d).

9. A method of producing a foamed glass plate having a foamed glass layer which has a wavy surface and a dense and transparent or translucent glass surface layer which tightly bonds to the wavy surface of the foamed glass layer, the method comprising the steps of:
 (a) pouring a granular or powdery first material comprising a glass powder and a foaming agent onto a conveyor belt, which is made of a heat resistant material and runs horizontally, so as to layer the first material on the belt;
 (b) pouring a second material comprising glass grains which are 0.5–5 mm in grain size onto the layer of said first material on said belt so as to create ripply undulations in the upper surface of said layer of the first material and form a layer of the second material on said layer of the first material; and
 (c) introducing said first and second materials in layers on said belt into a furnace and in said furnace firing said first and second materials in layers on said belt to cause fusion of the glasses in the respective layers and foaming of the fused first material.

10. A method according to claim 9, further comprising the step of pressing the upper surface of said layer of said second material during or soon after the step (c).

11. A method according to claim 9, further comprising the step of forming a layer of a third material comprising a granular or powdery glass on said layer of said second material after step (b) and before step (c), whereby said layer of the third material too is fired at the step (c).

12. A method according to claim 9, wherein said glass grains of said second material are 1 to 4 mm in grain size.

13. A method according to claim 12, wherein deviations of the grain sizes of the individual grains of said glass grains from a mean grain size of said glass grains are not greater than ±0.4 mm.

14. A method according to claim 9, wherein said first material is in the form of granules which are 0.1 to 3 mm in grain size.

* * * * *